(12) United States Patent
Wagner et al.

(10) Patent No.: US 9,309,826 B2
(45) Date of Patent: Apr. 12, 2016

(54) METHOD AND DEVICE FOR ASCERTAINING A MODELING VALUE FOR A PHYSICAL VARIABLE IN AN ENGINE SYSTEM HAVING AN INTERNAL COMBUSTION ENGINE

(71) Applicants: Alexandre Wagner, Stuttgart (DE); Thomas Bleile, Stuttgart (DE); Slobodanka Lux, Deizisau (DE); Christian Fleck, Gerlingen (DE)

(72) Inventors: Alexandre Wagner, Stuttgart (DE); Thomas Bleile, Stuttgart (DE); Slobodanka Lux, Deizisau (DE); Christian Fleck, Gerlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 679 days.

(21) Appl. No.: 13/710,864

(22) Filed: Dec. 11, 2012

(65) Prior Publication Data

US 2013/0158834 A1    Jun. 20, 2013

(30) Foreign Application Priority Data

Dec. 15, 2011   (DE) .......................... 10 2011 088 763

(51) Int. Cl.
| | |
|---|---|
| F02D 41/26 | (2006.01) |
| F02D 41/00 | (2006.01) |
| F02D 41/14 | (2006.01) |
| F02M 25/07 | (2006.01) |

(52) U.S. Cl.
CPC .......... *F02D 41/263* (2013.01); *F02D 41/0062* (2013.01); *F02D 41/145* (2013.01); *F02D 41/1446* (2013.01); *F02M 25/0707* (2013.01); *F02M 25/0709* (2013.01); *F02M 25/0728* (2013.01); *Y02T 10/47* (2013.01)

(58) Field of Classification Search
CPC ... F02D 41/18; F02D 41/263; F02D 2041/14; F02D 2041/142; F02D 2041/1423; F02D 2041/1425; F02M 25/0707; F02M 25/0709; Y02T 10/42; Y02T 10/49
USPC ................. 701/102, 103, 106, 108, 114, 115; 123/559.1, 559.2, 568.12, 568.14, 123/568.19
See application file for complete search history.

(56) References Cited

U.S. PATENT DOCUMENTS

| | | | | |
|---|---|---|---|---|
| 4,432,331 | A  * | 2/1984 | Yasuhara ................. | 123/568.16 |
| 6,352,065 | B1 * | 3/2002 | Wild et al. ..................... | 123/494 |
| 6,401,700 | B2 * | 6/2002 | Balekai et al. ........... | 123/568.12 |
| 7,016,779 | B2 * | 3/2006 | Bowyer ........................ | 701/108 |
| 7,062,910 | B2 * | 6/2006 | Inoue .......................... | 60/605.2 |
| 7,110,876 | B2 * | 9/2006 | Uchiyama et al. ............ | 701/108 |
| 7,117,078 | B1 * | 10/2006 | Gangopadhyay ............. | 701/103 |
| 7,472,014 | B1 * | 12/2008 | Albertson et al. ............ | 701/103 |
| 2003/0221669 | A1 * | 12/2003 | Henn et al. .................... | 123/399 |
| 2006/0042591 | A1 * | 3/2006 | Henn et al. .................... | 123/399 |
| 2006/0116808 | A1 * | 6/2006 | Tanaka .......................... | 701/102 |
| 2007/0043498 | A1 * | 2/2007 | McLain ........................ | 701/108 |
| 2008/0141982 | A1 * | 6/2008 | Mai et al. ..................... | 123/520 |

(Continued)

*Primary Examiner* — John Kwon
*Assistant Examiner* — Johnny H Hoang
(74) *Attorney, Agent, or Firm* — Kenyon & Kenyon LLP

(57) ABSTRACT

A method for determining a modeling value of a physical variable in a gas guiding section of an engine system including an internal combustion engine, includes the following steps: operating the engine system in such a way that an air mass flow is present in the gas guiding section; determining instantaneous values of other physical variables; and determining the modeling value of the physical variable by solving a differential equation, which results as the discretization of a differential equation, with the aid of the previously ascertained instantaneous values of the other physical variables.

14 Claims, 2 Drawing Sheets

(56) References Cited

U.S. PATENT DOCUMENTS

2008/0167787 A1* 7/2008 Kang et al. .................. 701/103
2009/0048765 A1* 2/2009 Kang et al. .................. 701/108
2011/0184632 A1* 7/2011 Kang et al. .................. 701/109
2012/0055156 A1* 3/2012 Grimm et al. ............... 60/605.2

* cited by examiner

METHOD AND DEVICE FOR ASCERTAINING A MODELING VALUE FOR A PHYSICAL VARIABLE IN AN ENGINE SYSTEM HAVING AN INTERNAL COMBUSTION ENGINE

CROSS REFERENCE TO RELATED APPLICATION

The present application claims priority to Application No. DE 10 2011 088 763.6, filed in the Federal Republic of Germany on Dec. 15, 2011, which is incorporated herein in its entirety by reference thereto.

FIELD OF INVENTION

The present invention relates in general to internal combustion engines. In particular, the present invention relates to the ascertainment of one or more modeling values for a physical variable in an exhaust gas discharge section.

BACKGROUND INFORMATION

Modern internal combustion engines include an exhaust gas recirculation line, which may be implemented both on the high-pressure side and also on the low-pressure side. In high-pressure-side exhaust gas recirculation, the combustion exhaust gas which flows out of the internal combustion engine is recirculated into an intake manifold section of an air supply system. In low-pressure-side exhaust gas recirculation, the combustion exhaust gas is removed from the exhaust gas discharge section after passing through a turbine of an exhaust-gas-driven turbocharger and returned to the intake side of a compressor of the turbocharger.

To comply with exhaust gas regulations, it is essential to know the physical variables which relate to the air supply system and the exhaust gas discharge section. In particular, determining and setting the exhaust gas recirculation rates of the low-pressure-side exhaust gas recirculation require the correct determination of the exhaust gas pressure and the gas mass flow on the low-pressure-side branching point in the exhaust gas discharge section. These variables may be measured with the aid of suitable sensors; however, suitable modeling of the physical variables is used to minimize the number of required sensors.

SUMMARY

According to the present invention, a method for determining one or more physical variables in an exhaust gas discharge section of an engine system having a turbocharged internal combustion engine and a low-pressure-side exhaust gas recirculation, and the device, the engine system, and the computer program product are provided.

According to a first aspect, a method for determining a modeling value of a physical variable in a gas guiding section of an engine system having an internal combustion engine is provided. The method includes the following steps:
operating engine system (1) in such a way that an air mass flow exists in the gas guiding section;
determining instantaneous values of other physical variables;
determining the modeling value of the physical variable by solving a differential equation, which results as a discretization of a differential equation, with the aid of the previously ascertained instantaneous values of the other physical variables.

Physical variables, which are not measured by corresponding sensors, were previously modeled, or the measured values of the corresponding sensors were subjected to a plausibility check with the aid of additional modeling of the physical variables for the operation of an engine system. In order to describe the physical states in the air supply system or in the exhaust gas discharge section, an equation system is typically prepared employing a throttle model, the ideal gas equation, the law of conservation of mass, and/or the like. A differential equation results for the physical variable to be modeled. The differential equation is typically solved with the aid of the control unit by discretization. The differential equation was previously discretized with the aid of an explicit method. The following problems may occur:

A dynamic inaccuracy or instability occurs in certain operating ranges, in particular in the event of small pressure drops via control valves which have been taken into account in the equation system.

A dynamic inaccuracy or an instability occurs as a function of the application of a gas volume.

To avoid instabilities, the cycle times of the calculation of the discretization must be decreased, whereby the required computing power increases.

A possible approximation of the functions of the equation system to avoid the instability problems results in a stationary inaccuracy.

Since small pressure drops are generally to be expected in the low-pressure-side gas guiding system, the stability and accuracy of the model used are of particular significance in this field.

One idea of the above-mentioned method is to determine a physical variable present at the branching point of the low-pressure-side exhaust gas recirculation line with the aid of a suitable model and calculation method. In contrast to the procedure provided in the related art of determining the physical variable with the aid of an explicit discretization, it is now provided to calculate the physical variable by a discretization with the aid of an implicit method and to ensure with the aid of a suitable calculation sequence that the time-discrete implementation of the model equation is always stable independently of the application or operating range. It is thus possible that the calculations of the instantaneous values of the physical variable may take place with the aid of the discretized differential equation in larger time steps, whereby the required computing time in the control unit is reduced.

In addition, the stationary and dynamic accuracy of the calculated exhaust gas pressure at the branching point of the low-pressure-side exhaust gas recirculation line and the gas mass flows via the low-pressure-side exhaust gas recirculation valve may be improved.

The solution of the equation obtained by the use of the implicit method is frequently not directly determinable. It is therefore provided that the physical variable is ascertained by an iteration method. Fixing a search interval is required for the selected method. To accelerate the iteration method, the search interval is selected to be as small as possible. The upper and lower limits of the search interval may be ascertained in that the intake-side pressure of the compressor is set equal to the ambient pressure and the ambient pressure is set equal to the intake-side pressure of the compressor, in order to determine the maximum or minimum values of the physical variable.

Furthermore, the differential equation may be calculated based on an equation system employing a throttle model, the ideal gas equation, and/or the law of conservation of mass.

According to one exemplary embodiment, the physical variable may correspond to a pressure and/or a gas mass flow at a branching point for an exhaust gas recirculation line downstream from a turbine of an exhaust-gas-driven turbocharger.

Furthermore, the other physical variables may include the position of an exhaust gas recirculation valve situated in a low-pressure-side exhaust gas recirculation line, the position of an exhaust gas valve situated downstream from a branching point for the exhaust gas recirculation line, the ambient pressure, the exhaust gas flow flowing to the branching point, the temperature of the exhaust gas at the branching point, and a pressure at an intake point of the exhaust gas recirculation line upstream from a compressor of an exhaust-gas-driven turbocharger.

It may be provided that the discretization of the differential equation is carried out according to an implicit method.

Furthermore, the modeling value of the physical variable may be used in a regulation, in particular in an exhaust gas recirculation rate regulation or air mass flow regulation or the like.

According to one exemplary embodiment, the differential equation may be solved by an iterative method in order to determine the physical variable.

In particular, the iterative method may be carried out between a first limiting value and a second limiting value for the physical variable.

The other physical variables may include a first pressure in a first volume and a second pressure in a second volume of the gas guiding system, the first volume and the second volume being separated from one another by a flow resistance, the first limiting value for the physical variable being determined in that the first pressure is set equal to the second pressure, and the second limiting value for the physical variable being determined in that the second pressure is set equal to the first pressure.

Alternatively or additionally, the modeling value of the physical variable may be determined for the plausibility check of the physical variable.

According to another aspect, a device for determining a modeling value of a physical variable in a gas guiding section of an engine system having an internal combustion engine is provided. The device is designed to:

operate the engine system in such a way that an air mass flow is present in the gas guiding section;
determine instantaneous values of other physical variables;
determine the modeling value of the physical variable by solving a differential equation, which results as a discretization of a differential equation, with the aid of the previously ascertained instantaneous values of the other physical variables.

According to another aspect, an engine system (1) having an internal combustion engine is provided, to which air is supplied via an air supply section and from which combustion exhaust gas is discharged via an exhaust gas discharge section, an exhaust gas recirculation line connecting a branching point provided downstream from an exhaust-gas-driven turbocharger to an intake point, which is situated upstream from the exhaust-gas-driven turbocharger in the air supply section, and having a device to ascertain a value of the physical variable existing at the branching point.

According to another aspect, a computer program product is provided, which contains a program code which carries out the above-mentioned method when it is executed on a data processing device.

BRIEF DESCRIPTION OF THE DRAWINGS

Exemplary embodiments of the present invention are explained in greater detail below with reference to the accompanying drawings.

DETAILED DESCRIPTION

Figure 1:
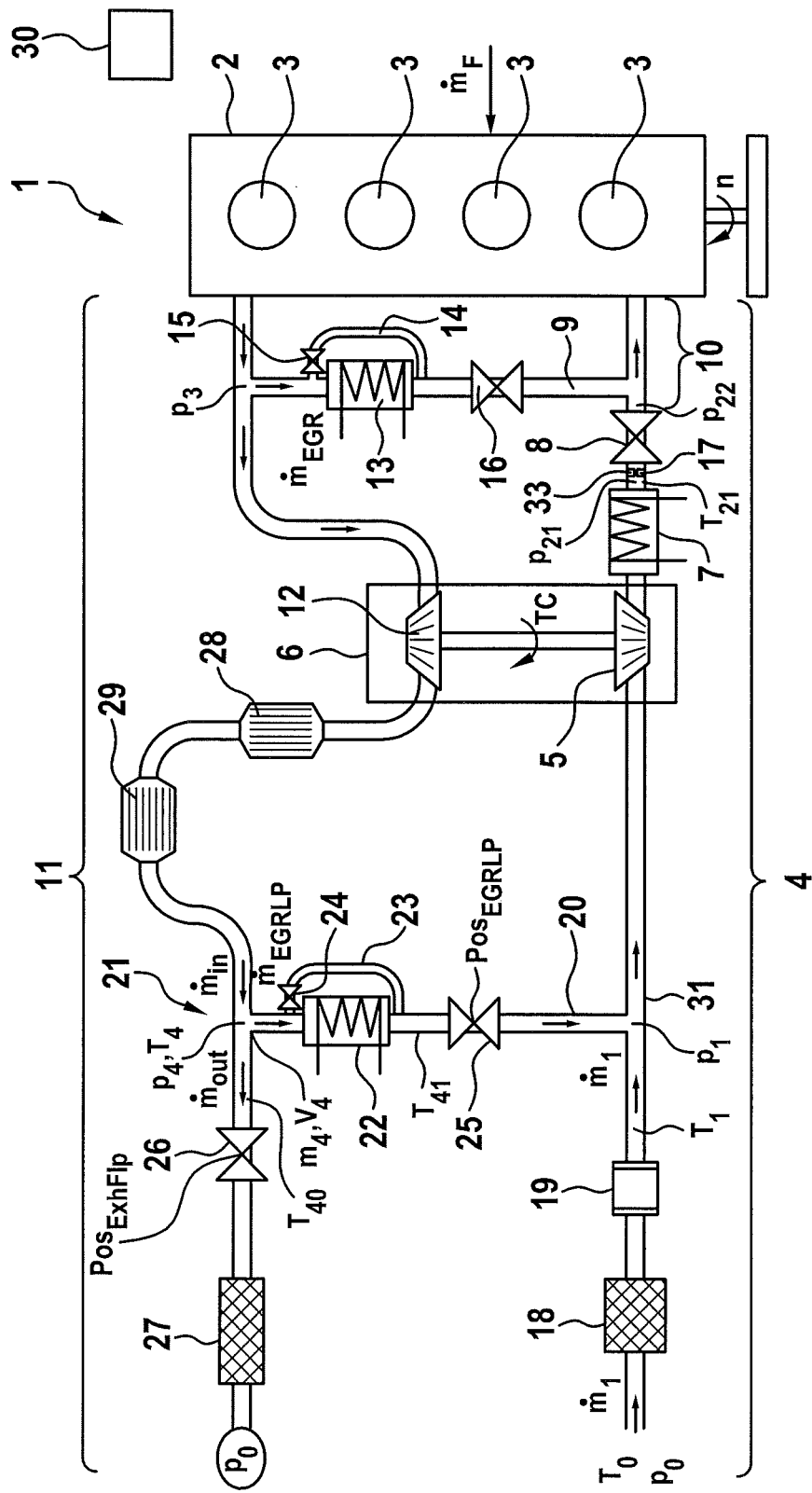
FIG. 1 shows a schematic view of an engine system having a turbocharged internal combustion engine and a low-pressure-side exhaust gas recirculation line.

FIG. 1 shows an engine system 1 having an internal combustion engine 2, which may be designed as a diesel engine or a gasoline engine, for example. Internal combustion engine 2 has four cylinders 3 in the exemplary embodiment shown. However, the number of cylinders 3 is unimportant for the applicability of the method described hereafter.

Engine system 1 also has an air supply section 4 to supply fresh air to cylinders 3 of internal combustion engine 2. The fresh air is introduced via corresponding intake valves (not shown) into the combustion chambers of cylinders 3. A compressor 5 of an exhaust-gas-driven turbocharger 6, a charge air cooler 7 downstream from compressor 5, and a throttle valve 8 downstream from charge air cooler 7 are situated in air supply section 4 of engine system 1.

Downstream from throttle valve 8, a first exhaust gas recirculation line 9 opens into the section designated as intake manifold 10 between throttle valve 8 and the intake valves of cylinders 3 of internal combustion engine 2.

An exhaust gas discharge section 11 is provided to discharge combustion exhaust gases, which are expelled from cylinders 3 via outlet valves (not shown). A turbine 12 of turbocharger 6, which is driven by using the exhaust gas enthalpy of the combustion exhaust gas, is situated in exhaust gas discharge section 11. Turbine 12 is coupled to compressor 5 of turbocharger 6 to drive it, so that fresh air is suctioned out of the surroundings and is provided at a charge pressure $p_{21}$ downstream from compressor 5. First exhaust gas recirculation line 9 branches off from exhaust gas discharge section 11 between the outlet valves and turbine 12.

A first exhaust gas cooler 13 and a first bypass line 14, which bypasses first exhaust gas cooler 13, are provided in first exhaust gas recirculation line 9. A first bypass valve 15 is situated in first bypass line 14, using which the efficiency of first exhaust gas cooler 13 may be set.

Furthermore, a first exhaust gas recirculation valve 16 is provided between first exhaust gas cooler 13 and the opening of first exhaust gas recirculation line 9 into intake manifold 10 of air supply section 4. By variable adjustment of first exhaust gas recirculation valve 16, an exhaust gas recirculation rate may be set or influenced. The exhaust gas recirculation rate generally indicates the fraction of combustion exhaust gas in the gas mixture supplied to cylinders 3.

Furthermore, an air filter 18 and an air mass flow sensor 19 are provided in air guiding section 4, to detect air quantity $\dot{m}_1$ flowing into air supply section 4.

A second exhaust gas recirculation line 20 is provided, which connects a branching point 21 in exhaust gas discharge section 11 downstream from turbine 12 to an intake point upstream from compressor 5, i.e., between air mass flow sensor 19 and turbine 12. A second exhaust gas cooler 22 is provided in second exhaust gas recirculation line 20. A second bypass line 23 is provided, which bypasses second exhaust gas cooler 22. A bypass valve 24 is situated in second bypass line 23, using which the efficiency of second exhaust gas cooler 22 may be set.

Furthermore, a second exhaust gas recirculation valve 25 is provided between second exhaust gas cooler 22 and the opening of second exhaust gas recirculation line 20 into the section of air supply system 4 upstream from compressor 5. An exhaust gas recirculation rate to be set may also be influenced by setting second exhaust gas recirculation valve 25. The overall desired exhaust gas recirculation rate is generally set through corresponding settings of first and/or second exhaust gas recirculation valves 16, 25.

An exhaust gas butterfly valve 26 is provided downstream from branching point 21, to be able to set exhaust gas pressure $p_4$ existing at branching point 21. Furthermore, a muffler 27 may also be provided downstream from exhaust gas butterfly valve 26. A catalytic converter 28 and a particle filter 29 may be provided upstream from branching point 21.

Furthermore, a control unit 30 is provided, which operates internal combustion engine 2. For example, control unit 30 carries out a charge pressure and air mass flow regulation as well as an exhaust gas recirculation regulation to operate internal combustion engine 2 in an optimized way. The implementation of the regulations for operating internal combustion engine 2 is sufficiently known from the related art.

Suitable sensors are provided to obtain the physical variables of engine system 1 which are required for carrying out the regulation. In particular, ambient pressure $p_0$, position $Pos_{EGRLP}$ of second exhaust gas recirculation valve 25, and position $Pos_{ExhFlp}$ of exhaust gas butterfly valve 26 are detected by sensors and provided to control unit 30. Furthermore, a temperature sensor 17 may be provided between charge air cooler 7 and throttle valve 8 to ascertain charge air temperature $T_{21}$ of the charge air upstream from throttle valve 8. Furthermore, airflow sensor 19 upstream from compressor 5 is used to ascertain fresh air mass flow $\dot{m}_1$ aspirated in by engine system 1.

Furthermore, units (not shown) are provided for detecting speed n of internal combustion engine 2. As a function of speed n, the number of cylinders, the air expenditure (ratio of the actual gas mass to the theoretical possible gas mass in internal combustion engine 2), and intake manifold pressure $p_{22}$ in intake manifold 10, and volume flow $\dot{V}_{22}$ into internal combustion engine 2 may be ascertained. Alternatively or additionally, a pressure sensor 33 may be provided in the area between charge air cooler 7 and throttle valve 8 to ascertain a charge air pressure $p_{21}$. Alternatively, a pressure sensor 33 may also be provided in intake manifold 10 to ascertain intake manifold pressure $p_{22}$ directly.

Furthermore, final control elements or actuators are provided to influence the operation of internal combustion engine 2. Throttle valve 8, first and second exhaust gas recirculation valves 16, 25, first and second bypass valves 15, 24, a unit for setting an efficiency of turbocharger 6, for example, settable via a variable turbine geometry of turbine 12, the intake valves and outlet valves, and exhaust gas butterfly valve 26 are typically provided as the final control elements. The settings of the corresponding final control elements are also known in control unit 30. In particular, the positions of the individual valves or final control elements may be read back by suitable sensors, in order to always provide up-to-date information about the position of the individual final control elements.

It is necessary to know one or more physical variables at branching point 21 of second exhaust gas recirculation line 20 in order to carry out an exhaust gas recirculation regulation in an engine system 1 having a high-pressure-side exhaust gas recirculation and a low-pressure-side exhaust gas recirculation. In particular, it is necessary to know a branching point pressure $p_4$ at the branching point and a recirculation mass flow $\dot{m}_{EGRLP}$ flowing in second exhaust gas recirculation line 20. These are typically not measured, but rather must be ascertained by a model and calculated in control unit 30 in real time.

Figure 2:
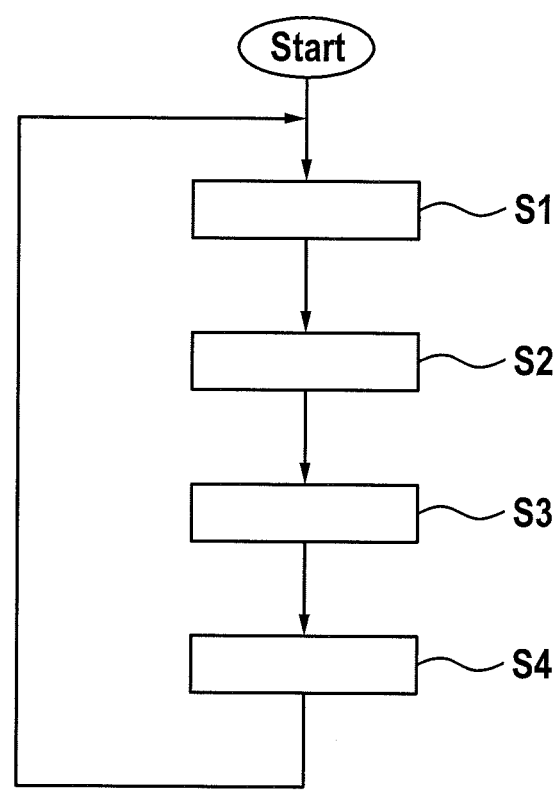
FIG. 2 shows a flow chart to illustrate a method for ascertaining a modeling value of a physical variable in the engine system of FIG. 1.

FIG. 2 shows a flow chart to illustrate the method for ascertaining a physical variable, e.g., branching point pressure $p_4$ at branching point 21 and a recirculation mass flow $\dot{m}_{EGRLP}$ flowing in second exhaust gas recirculation line 20.

The calculations of the above-mentioned physical variables are based on the sensor or model variables of an intake point pressure $p_1$ at an intake point 31, at which second exhaust gas recirculation line 20 opens into air supply section 4.

Pressure $p_0$ downstream from exhaust gas butterfly valve 26, which corresponds to an ambient pressure of engine system 1, temperature $T_4$ at low-pressure-side branching point 21, a gas temperature $T_{41}$ upstream from low-pressure-side second exhaust gas recirculation valve 25, and a gas temperature $T_{40}$ upstream from exhaust gas butterfly valve 26, branching point gas mass flow $\dot{m}_{IN}$ in a low-pressure-side volume $V_4$, which corresponds to the volume present at branching point 21, and position $Pos_{EGRLP}$ of second exhaust gas recirculation valve 25 and position $Pos_{ExhFlp}$ of exhaust gas butterfly valve 26 are the sensor and model variables used in the present case.

In a step S1, the above-mentioned variables are ascertained in a suitable way, i.e., measured or calculated according to a calculation model.

To model branching point exhaust gas pressure $p_4$ and branching point gas mass flow $\dot{m}_{EGRLP}$, this following differential algebraic equation may be established:

$$p_4(t) = f(V_4, m_4(t), T_4(t))$$
$$\dot{m}_{out}(t) = g(p_4(t), p_0(t), Pos_{ExhFlp}(t), T_4(t))$$
$$\frac{dm_4(t)}{dt} = \dot{m}_{in}(t) - \dot{m}_{Out}(t) - \dot{m}_{EGRLP}(t)$$
$$\dot{m}_{EGRLP}(t) = h(p_4(t), p_1(t), Pos_{EGRLP}(t), T_4(t))$$

Above-indicated functions f( ), g( ), h( ) correspond to model functions for describing the relationships between the physical variables. Function f( ) corresponds to the ideal gas equation, which is known per se, functions g( ) and h( ) correspond to throttle equations known per se, which indicate the relationship between the physical variables of gas volume $V_4$ in the area of branching point 21, and the function of a mass flow balance at branching point 21.

The model specified by above-mentioned differential algebraic equation (1) may be discretized as follows:

$$p_4(t_k) = f(V_4, m_4(t_k), m_4(t_{k-1}), T_4(t_{k-1}))$$
$$\dot{m}_{out}(t_k) = g(p_4(t_k), p_4(t_{k-1}), p_0(t_{k-1}), Pos_{ExhFlp}(t_{k-1}), T_4(t_{k-1}))$$
$$\dot{m}_{EGRLP}(t_k) = h(p_4(t_k), p_4(t_{k-1}), p_1(t_{k-1}) Pos_{EGRLP}(t_{k-1}), T_4(t_{k-1}))$$
$$m_4(t_k) = l(m_4(t_{k-1}), m_4(t_{k-1}), \dot{m}_{In}(t_{k-1}), \dot{m}_{EGRLP}(t_k), \Delta t)$$
$$t_k = k \cdot \Delta t, i = 0, \ldots, n$$
$$k = 1, 2, 3 \ldots$$
$$n = 1, \ldots, k$$

where l( ) corresponds to the function of conservation of mass.

In the case of this discretization according to an implicit method, in contrast to the discretization according to an explicit method known from the related art, instantaneously stored gas mass $m_4(t_k)$ in volume $V_4$ at branching point 21 is used to calculate instantaneous branching point exhaust gas pressure $p_4(t_k)$. In the above-mentioned equation system, the other states may assume any arbitrary value independently of one another, i.e., the instantaneous value or a previously detected value. This method is referred to as implicit discretization.

If one rearranges the above-mentioned non-linear equation system, the following nonlinear equation is obtained:

$$m_4(t_k) = l \begin{pmatrix} m_4(t_{k-1}), \\ m_4(t_{k-1}), \\ \dot{m}_{In}(t_{k-1}), \\ g(f(V_4, m_4(t_k), m_4(t_{k-1}), T_4(t_{k-1})), p_4(t_{k-1}), p_0(t_{k-1}), Pos_{ExhFlp}(t_{k-1}), T_4(t_{k-1})), \\ h(f(V_4, m_4(t_k), m_4(t_{k-1}), T_4(t_{k-1})), p_4(t_{k-1}), p_1(t_{k-1}), Pos_{EGRLP}(t_{k-1}), T_4(t_{k-1})), \Delta t \end{pmatrix}$$

$$t_k = k \cdot \Delta t, i = 0, \ldots, n$$
$$n = 1, \ldots, k.$$

This nonlinear equation system is solved at each point in time $t_k$. It is apparent that $m_4(t_k)$ is present on both sides of the equation and therefore the equation may not be solved directly for $m_4(t_k)$. The above-mentioned equation may be analytically solved under certain circumstances depending on functions $l(\ ), g(\ ), f(\ ), h(\ )$, but in general it is necessary to use iterative methods, for example, a Newton method, to determine a solution. These types of iterative methods also result in instabilities in the event of small pressure drops due to singularities in functions $g(\ )$ and $h(\ )$ of the above-mentioned equation. To avoid this, an inclusion method may be used to solve this nonlinear equation.

The application of the inclusion method will be described hereafter on the basis of a concrete example for ascertaining exhaust gas pressure $p_4(t_k)$ in an air supply system. Branching point 21 includes a volume having two outlets, which conduct a partial mass flow to exhaust gas butterfly valve 26 and a partial mass flow in second exhaust gas recirculation line 20. Each of the outlets contains a throttle, namely exhaust gas butterfly valve 26 and second exhaust gas recirculation valve 25.

The following equation system describes pressure $p_4(t_k)$ at branching point 21.

$$\dot{m}_{In}(t) = \dot{m}_{Out}(t) + \dot{m}_{EGRLP}(t) + \frac{dm_4(t)}{dt}$$

$$m_4(t) = \frac{p_4(t) \cdot V_4}{R \cdot T_4(t)}$$

$$\Pi_0(t) = \frac{p_o(t)}{p_4(t)}$$

$$\Pi_1(t) = \frac{p_1(t)}{p_4(t)}$$

$$\dot{m}_{Out}(t) = p_4(t) \cdot A_{ExhFlp}(t) \cdot \psi(\Pi_0(t)) \cdot \sqrt{\frac{2}{R \cdot T_4(t)}}$$

$$\dot{m}_{EGRLP}(t) = p_4(t) \cdot A_{EGRLP}(t) \cdot \psi(\Pi_1(t)) \cdot \sqrt{\frac{2}{R \cdot T_4(t)}}$$

$$\psi(\Pi) = \begin{cases} \psi_{crit} & 0 \leq \Pi \leq \Pi_{crit} \\ \sqrt{\frac{\kappa}{\kappa-1} \cdot \left(\Pi^{\frac{2}{\kappa}} - \Pi^{\frac{\kappa+1}{\kappa}}\right)} & \Pi_{crit} \leq \Pi \leq 1 \end{cases}$$

where $\psi(\Pi)$ corresponds to a flow rate function. For flow rate function $\psi(\Pi)$, an approximation may be used, which was described in greater detail, for example, in German Application No. DE 10 2008 043 965 A1:

$$\sqrt{\frac{\kappa}{\kappa-1} \cdot \left(\Pi^{\frac{2}{\kappa}} - \Pi^{\frac{\kappa+1}{\kappa}}\right)} \approx \psi_{crit} \sqrt{2 \cdot \frac{1-\Pi}{1-\Pi_{crit}} - \left(\frac{1-\Pi}{1-\Pi_{crit}}\right)^2} \quad \Pi_{crit} \leq \Pi \leq 1.$$

Therefore $$\frac{V_4}{R} \cdot \frac{d}{dt}\left(\frac{p_4(t)}{T_4(t)}\right) + p_4(t) \cdot A_{ExhFlp}(t) \cdot \psi\left(\frac{p_0(t)}{p_4(t)}\right) \cdot \sqrt{\frac{2}{R \cdot T_4(t_i)}} +$$

$$p_4(t) \cdot A_{EGRLP}(t) \cdot \psi\left(\frac{p_1(t)}{p_4(t)}\right) \cdot \sqrt{\frac{2}{R \cdot T_4(t_i)}} = \dot{m}_{In}(t)$$

The temperature only changes very slowly. Therefore, for simplification, it is considered to be constant between two measurements $[t_{i-1}, t_i]$: $T_4(t_{i-1}) = T_4(t_i)$. For $t \in [t_{i-1}, t_i]$, the following equation applies:

$$\frac{V_4}{R \cdot T_4(t_i)} \cdot \frac{dp_4(t)}{dt} + p_4(t) \cdot A_{ExhFlp}(t) \cdot \psi\left(\frac{p_0(t)}{p_4(t)}\right) \cdot \sqrt{\frac{2}{R \cdot T_4(t_i)}} +$$

$$p_4(t) \cdot A_{EGRLP}(t) \cdot \psi\left(\frac{p_1(t)}{p_4(t)}\right) \cdot \sqrt{\frac{2}{R \cdot T_4(t_i)}} = \dot{m}_{In}(t)$$

To solve this differential equation in $p_4(t)$ for $t=t_i$, in step S2 an interval is initially determined for $p_4(t)$. In general, $p_4(t) \geq p_0(t) \geq p_1(t)$.

1. If $p_{1,max}(t) = p_0(t)$ is inserted in the above-mentioned equation, the maximum value results for $p_4(t)$, i.e., $p_{4,max}(t)$ as the solution of differential equation $$\frac{V_4}{R \cdot T_4(t_i)} \cdot \frac{dp_{4,max}(t)}{dt} +$$

$$p_{4,max}(t) \cdot (A_{EGRLP}(t) + A_{ExhFlp}(t)) \cdot \psi\left(\frac{p_0(t)}{p_{4,max}(t)}\right) \cdot \sqrt{\frac{2}{R \cdot T_4(t_i)}} = \dot{m}_{In}(t)$$

2. If $p_{0,min}(t) = p_1(t)$ is inserted in the above-mentioned equation, the minimum value results for $p_4(t)$, i.e., $p_{4,min}(t)$ as the solution of differential equation $$\frac{V_4}{R \cdot T_4(t_i)} \cdot \frac{d p_{4,min}(t)}{dt} +$$

$$p_{4,min}(t) \cdot (A_{ExhFlp}(t) + A_{EGRLP}(t)) \cdot \psi\left(\frac{p_1(t)}{p_{4,min}(t)}\right) \cdot \sqrt{\frac{2}{R \cdot T_4(t_i)}} = \dot{m}_{In}(t)$$

A method for solving the above differential equations is also described in German Application No. DE 10 2008 043 965 A1.

Thus, for solution $p_4(t)$ for $t \in [t_{i-1}, t_i]$ $p_{4,min}(t) \leq p_4(t) \leq p_{4,max}(t)$.

In order to finally determine $p_4(t)$, the above-mentioned differential equation is implicitly discretized. For example, the implicit Euler method is applied:

$$\frac{V_4}{R \cdot T_4(t_i)} \cdot \frac{(p_4(t_i) - p_4(t_{i-1}))}{\Delta t} + p_4(t_i) \cdot A_{ExhFlp}(t_i) \cdot \psi\left(\frac{p_0(t_i)}{p_4(t_i)}\right) \cdot \sqrt{\frac{2}{R \cdot T_4(t_i)}} +$$

$$p_4(t_i) \cdot A_{EGRLP}(t_i) \cdot \psi\left(\frac{p_1(t_i)}{p_4(t_i)}\right) \cdot \sqrt{\frac{2}{R \cdot T_4(t_i)}} = \dot{m}_{In}(t_i)$$

The previously calculated interval for $p_4(t)$ is still valid for $p_4(t_i)$.

Finding the solution of this nonlinear equation is equivalent to the zero search of the following function:

$$f(p_4(t_i)) = \frac{V_4}{R \cdot T_4(t_i)} \cdot \frac{(p_4(t_i) - p_4(t_{i-1}))}{\Delta t} +$$

$$p_4(t_i) \cdot A_{ExhFlp}(t_i) \cdot \psi\left(\frac{p_0(t_i)}{p_4(t_i)}\right) \cdot \sqrt{\frac{2}{R \cdot T_4(t_i)}} +$$

$$p_4(t_i) \cdot A_{EGRLP}(t_i) \cdot \psi\left(\frac{p_1(t_i)}{p_4(t_i)}\right) \cdot \sqrt{\frac{2}{R \cdot T_4(t_i)}} = \dot{m}_{In}(t_i)$$

For the function $f(p_4)$: $f(p_{4,min}(t_i)) \cdot f(p_{4,max}(t_i)) \leq 0$ and in the interval $p_4(t_i) \in [p_{4,max}(t_i)]$, there is only one zero for $f(p_4)$.

Subsequently, the above-mentioned nonlinear equation is iteratively solved in step S3. To iteratively solve this nonlinear equation, the inclusion method is used, i.e., the iteration is carried out in the interval determined in step S2. This includes methods such as bisection, regula falsi, or the much more efficient methods, such as that of Pegasus, Illinois, or Anderson-Björck.

The result of the iteration of step S3 is provided in step S4 to a corresponding downstream function, for example, an exhaust gas recirculation regulation or the like.

The above-described method is also applicable for system configurations having other flow resistances or also for the case in which the temperatures upstream from throttles differ from the temperature in volume $V_4$.

For example, if second exhaust gas recirculation cooler 22 is located upstream from second exhaust gas recirculation valve 25 ($T_{41} \neq T_4$) or if gas temperatures $T_{40}$ and $T_4$ differ from one another, temperatures $T_{40}$ and $T_{41}$ must be taken into account in the system equation.

Temperatures $T_{40}$ and $T_{41}$ may be measured (sensor) or modeled.

The following equation therefore results:

$$\frac{V_4}{R} \cdot \frac{d}{dt}\left(\frac{p_4(t)}{T_4(t)}\right) + p_4(t) \cdot A_{ExhFlp}(t) \cdot \psi\left(\frac{p_0(t)}{p_4(t)}\right) \cdot \sqrt{\frac{2}{R \cdot T_4(t)}} \cdot \sqrt{\frac{T_4(t)}{T_{40}(t)}} +$$

$$p_4(t) \cdot A_{EGRLP}(t) \cdot \psi\left(\frac{p_1(t)}{p_4(t)}\right) \cdot \sqrt{\frac{2}{R \cdot T_4(t)}} \cdot \sqrt{\frac{T_4(t)}{T_{41}(t)}} = \dot{m}_{In}(t)$$

where $$A^*_{ExhFlp}(t) = A_{ExhFlp}(t) \cdot \sqrt{\frac{T_4(t)}{T_{40}(t)}}$$

$$A^*_{EGRLP}(t) = A_{EGRLP}(t) \cdot \sqrt{\frac{T_4(t)}{T_{41}(t)}}$$

the following equation results $$\frac{V_4}{R} \cdot \frac{d}{dt}\left(\frac{p_4(t)}{T_4(t)}\right) + p_4(t) \cdot A^*_{ExhFlp}(t) \cdot \psi\left(\frac{p_0(t)}{p_4(t)}\right) \cdot \sqrt{\frac{2}{R \cdot T_4(t)}} +$$

$$p_4(t) \cdot A^*_{EGRLP}(t) \cdot \psi\left(\frac{p_1(t)}{p_4(t)}\right) \cdot \sqrt{\frac{2}{R \cdot T_4(t)}} = \dot{m}_{In}(t),$$

which may be solved according to the above-described method.

If pressure losses via additional flow resistances are present, they may also be taken into account in the effective areas. It is presumed that the relationship between the physical variables of the throttle equation is sufficient:

$$A_{eff}(t) = \frac{\dot{m}(t)}{p_{before}(t) \cdot \psi\left(\frac{p_{after}(t)}{p_{before}(t)}\right) \cdot \sqrt{\frac{2}{R \cdot T(t)}}}$$

Effective area $A_{eff}$ may be determined on an engine test bench. Additional pressure sensors in volume V4 and the pressure sensors downstream from exhaust gas butterfly valve 26 and downstream from second exhaust gas recirculation valve 25 are required. If first exhaust gas recirculation valve 16 is closed, the recirculated mass flow via second exhaust gas recirculation valve 25 may be calculated with the aid of $CO_2$ measurement technology in the intake manifold.

Stationary measurements, e.g., at the different operating points, may be carried out. The following equations are used at each measured operating point to calculate the effective areas:

$$A_{ExhFlp}(t) = \frac{\dot{m}_{Out}(t)}{p_4(t) \cdot \psi\left(\frac{p_0(t)}{p_4(t)}\right) \cdot \sqrt{\frac{2}{R \cdot T_4(t)}}}$$

$$A_{EGRLP}(t) = \frac{\dot{m}_{EGRLP}(t)}{p_4(t) \cdot \psi\left(\frac{p_1(t)}{p_4(t)}\right) \cdot \sqrt{\frac{2}{R \cdot T_4(t)}}}$$

Since the position of the valves is measured, the calculated effective areas may be represented as a function of the position and approximated with the aid of a characteristic curve, for example.

What is claimed is:

1. An automated method for determining a modeling value of at least one physical variable at a specific point in an exhaust gas discharge section of an engine system including an internal combustion engine which is supplied with air via an air supply section, the method comprising:
   operating the engine system to produce an exhaust gas mass flow in the exhaust gas discharge section;
   determining instantaneous values of other physical variables; and
   determining the modeling value of the at least one physical variable by solving a differential equation, which results as a discretization of a differential equation, with aid of the previously ascertained instantaneous values of the other physical variables, wherein the at least one physical variable corresponds to at least one of a pressure and an exhaust gas mass flow at a branching point of the exhaust gas discharge section downstream from a turbine of an exhaust-gas-driven turbocharger, wherein (i) a first branch from the branching point leads to a discharge point for the exhaust gas, and (ii) a second branch from the branching point forms a part of an exhaust gas recirculation line connecting the branching point to an intake point of the air supply section.

2. The method according to claim 1, wherein the differential equation is formed based on an equation system employing at least one of a throttle model, ideal gas equation and law of conservation of mass.

3. The method according to claim 1, wherein the other physical variables include a position of an exhaust gas recirculation valve, which is situated in a low-pressure-side exhaust gas recirculation line, a position of an exhaust gas valve, which is situated downstream from a branching point for the exhaust gas recirculation line, ambient pressure, an exhaust gas flow flowing to the branching point, a temperature of the exhaust gas at the branching point, and a pressure at an intake point of the exhaust gas recirculation line upstream from a compressor of an exhaust-gas-driven turbocharger.

4. The method according to claim 1, wherein the discretization of the differential equation is carried out according to an implicit method.

5. The method according to claim 1, wherein the modeling value of the at least one physical variable is used in one of an exhaust gas recirculation rate regulation and an air flow regulation.

6. The method according to claim 1, wherein the differential equation is solved by an iterative method to determine the at least one physical variable.

7. The method according to claim 6, wherein the iterative method is carried out between a first limiting value and a second limiting value for the at least one physical variable.

8. The method according to claim 7, wherein the other physical variables include a first pressure in a first volume portion of the exhaust gas discharge section and a second pressure in a second volume portion of the exhaust gas discharge section, the first volume portion and the second volume portion being separated from one another by a flow resistance, the first limiting value for the at least one physical variable being determined in that the first pressure is set equal to the second pressure, and the second limiting value for the at least one physical variable being determined in that the second pressure is set equal to the first pressure.

9. The method according to claim 1, wherein the modeling value of the at least one physical variable is determined for a plausibility check of the at least one physical variable.

10. The method according to claim 1, wherein the at least one physical variable corresponds to the pressure and the exhaust gas mass flow at the branching point.

11. A control device of an engine system for determining a modeling value of at least one physical variable at a specific point in an exhaust gas discharge section of the engine system including an internal combustion engine which is supplied with air via an air supply section, the control device comprising:
   a control unit including a processor configured to:
   operate the engine system to produce an exhaust gas mass flow in the exhaust gas discharge section;
   determine instantaneous values of other physical variables; and
   determine the modeling value of the at least one physical variable by solving a differential equation, which results as a discretization of a differential equation, with aid of the previously ascertained instantaneous values of the other physical variables, wherein the at least one physical variable corresponds to at least one of a pressure and an exhaust gas mass flow at a branching point of the exhaust gas discharge section downstream from a turbine of an exhaust-gas-driven turbocharger, wherein (i) a first branch from the branching point leads to a discharge point for the exhaust gas, and (ii) a second branch from the branching point forms a part of an exhaust gas recirculation line connecting the branching point to an intake point of the air supply section.

12. The control device according to claim 11, wherein the at least one physical variable corresponds to the pressure and the exhaust gas mass flow at the branching point.

13. A non-transitory computer-readable medium having stored thereon a computer program having program codes which, when executed on a computer, perform an automated method for determining a modeling value of at least one physical variable at a specific point in an exhaust gas discharge section of an engine system including an internal combustion engine which is supplied with air via an air supply section, the method comprising:
   operating the engine system to produce an exhaust gas mass flow in the exhaust gas discharge section;
   determining instantaneous values of other physical variables; and
   determining the modeling value of the at least one physical variable by solving a differential equation, which results as a discretization of a differential equation, with aid of the previously ascertained instantaneous values of the other physical variables, wherein the at least one physical variable corresponds to at least one of a pressure and an exhaust gas mass flow at a branching point of the exhaust gas discharge section downstream from a turbine of an exhaust-gas-driven turbocharger, wherein (i) a first branch from the branching point leads to a discharge point for the exhaust gas, and (ii) a second branch from the branching point forms a part of an exhaust gas recirculation line connecting the branching point to an intake point of the air supply section.

14. The non-transitory computer-readable medium according to claim 13, wherein the at least one physical variable corresponds to the pressure and the exhaust gas mass flow at the branching point.

* * * * *